United States Patent [19]
Powell, Jr. et al.

[11] Patent Number: 5,896,516
[45] Date of Patent: Apr. 20, 1999

[54] METHOD AND APPARATUS FOR REDUCING PROPAGATION LATENCY IN A HIGH SPEED CROSSBAR SWITCH

[75] Inventors: Lawrence Joseph Powell, Jr., Round Rock; Krishnamurthy Venkatramani, Austin, both of Tex.

[73] Assignee: International Business Machines Corporation, Armonk, N.Y.

[21] Appl. No.: 08/885,821

[22] Filed: Jun. 30, 1997

Related U.S. Application Data

[63] Continuation of application No. 08/521,856, Aug. 31, 1995, abandoned.

[51] Int. Cl.[6] .................................................. G06F 13/00
[52] U.S. Cl. .................................................. 395/312
[58] Field of Search .................................. 395/311, 312

[56] References Cited

U.S. PATENT DOCUMENTS

| | | | |
|---|---|---|---|
| 4,682,284 | 7/1987 | Schrofer | 395/875 |
| 4,811,210 | 3/1989 | McAulay . | |
| 4,875,722 | 10/1989 | Miller et al. | 292/92 |
| 4,991,084 | 2/1991 | Rodiger et al. | 395/311 |
| 5,016,167 | 5/1991 | Nguyen et al. . | |
| 5,140,583 | 8/1992 | May et al. | 370/60 |
| 5,170,393 | 12/1992 | Peterson et al. | 370/94.1 |
| 5,179,669 | 1/1993 | Peters . | |
| 5,187,796 | 2/1993 | Wang et al. . | |
| 5,197,130 | 3/1993 | Chen et al. . | |
| 5,392,429 | 2/1995 | Agrawal et al. . | |
| 5,420,853 | 5/1995 | McRoberts et al. | 370/58.1 |
| 5,521,913 | 5/1996 | Gridley | 370/58.2 |
| 5,555,543 | 9/1996 | Grohoski et al. | 370/58.1 |

*Primary Examiner*—Ayaz R. Sheikh
*Assistant Examiner*—Sumati Lefkowitz
*Attorney, Agent, or Firm*—David A. Mims, Jr.

[57] ABSTRACT

A protocol and apparatus for crossbar switches where the cycle time is too short to allow the updating of the input/output buffer controls by the arbitration logic in one cycle. The crossbar switch has separate data paths and commands paths. Two types of commands are sent over the crossbar switches. The first type is an address (A) only command which consist of a single packet needing one clock cycle. The second type of command is an Address with Data command (AD), consisting of two through nine packets, and requiring a maximum of nine clock cycles. A command becomes a request through two different paths through the crossbar switch. The first path is via an input bypass path which allows an input command buffer to be bypassed and a request written directly to a multiplexer. The second path is through the input command buffer which is written but not selected until processing is completed for the previous command. The crossbar protocol allows a request to be accepted by writing information into the output buffers before the accept is available.

13 Claims, 5 Drawing Sheets

METHOD AND APPARATUS FOR REDUCING PROPAGATION LATENCY IN A HIGH SPEED CROSSBAR SWITCH

This is a continuation of application Ser. No. 08/521,856 filed Aug. 31, 1995, now abandoned.

FIELD OF THE INVENTION

The present invention relates to data processing systems, and more particularly, to an architecture and internal protocol for a cross-bar switch which reduces propagation latency in high speed circuit designs.

BACKGROUND OF THE INVENTION

Bus arbitration protocols and methods for arbitrating bus access are well known in the art. Typically, the arbitration or protocol is designed to reduce the arbitration overhead when one of two subsystems continuously use a system bus. The arbitration protocol is also used to guarantee fairness thus insuring equal access to the system bus.

One example of an arbitration system decides who is sending and who is listening by way of a symmetrical protocol. Typically, three clock cycles are required in the symmetrical protocol where one cycle is used for sending a request, a second cycle is used for the arbitration, and a third cycle is used for the response with the proper selection.

Another example of an arbitration protocol uses a master-slave relationship where one system is the master and the other is the slave, such that the slave always makes requests for the bus while the master arbitrates whether to grant bus access to the slave. Like the symmetrical protocol, the master slave system requires at least three cycles to perform arbitration and grant bus access to any subsystem.

Multi-processor systems have shown that high bandwidth can be achieved using a cross-bar switch. Very large scale integration (VLSI) in semiconductor devices has led to the increased use of the cross-bar switch in semiconductor devices with requirements of low latency and high speed. One technique used multiple stages requiring several switches be set between input and output. Multiple stages increase latency and control complexity. Moreover, a particular problem with semiconductor devices communications, is the worst case delay resulting from two ports on a crossbar switch that are physically separated. In such an instance, communications must be carried out over long wire lengths on the semiconductor device in the range, of 2 to 10 millimeters. The communications frequently consist of an input buffer generating a request, and an output buffer generating an accept with the request and the accept traversing the long wire lengths.

It is desirable to have a crossbar switch protocol for reducing the number of cycles required for updating input/output data buffers by arbitration logic in a crossbar switch to one cycle.

SUMMARY OF THE INVENTION

This invention relates to a protocol and apparatus for crossbar switches where the cycle time is too short to allow the updating of the input/output buffer controls by the arbitration logic in one cycle. The invention is directed to reducing the latency resulting when a request must be delivered, and an accept acted on in the same cycle, which is on the order of 5 nanoseconds. Data from an input port must be propagated to an output port over long wires. The crossbar switch has separate data paths and commands paths. Two types of commands are sent over the crossbar switches. The first type is an address (A) only command which consists of a single packet needing one clock cycle. The second type of command is an Address with Data (AD) command, consisting of two through nine packets, and requiring up to a maximum of nine clock cycles. However, the first cycle in every command, which is the address cycle, is used for arbitration. If the AD command, for example, is accepted, the data will follow and an arbiter will ignore following AD commands until the data transfer has completed. A command becomes a request through two different paths through the crossbar switch. The first path is via an input bypass path which allows an input command buffer to be bypassed and a request written directly to a request multiplexer. The second path is through the input command buffer which is written, but not selected until processing is completed for the previous command. The crossbar switch protocol allows a request to be accepted by writing information into output buffers before the accept is available. If an accept is not generated, a reset line is brought active when the size of an Address/Data request is too large. The crossbar switch allows continuous writing of the output buffers every cycle, if an active request is generated from a different port every cycle. If the accept is not activated, the request multiplexer selects a temporary buffer to send the same request again. The crossbar switch provides the capability of choosing between resending the same command or sending a command out of the input command buffer.

DETAILED DESCRIPTION OF THE EMBODIMENTS

Figure 1:
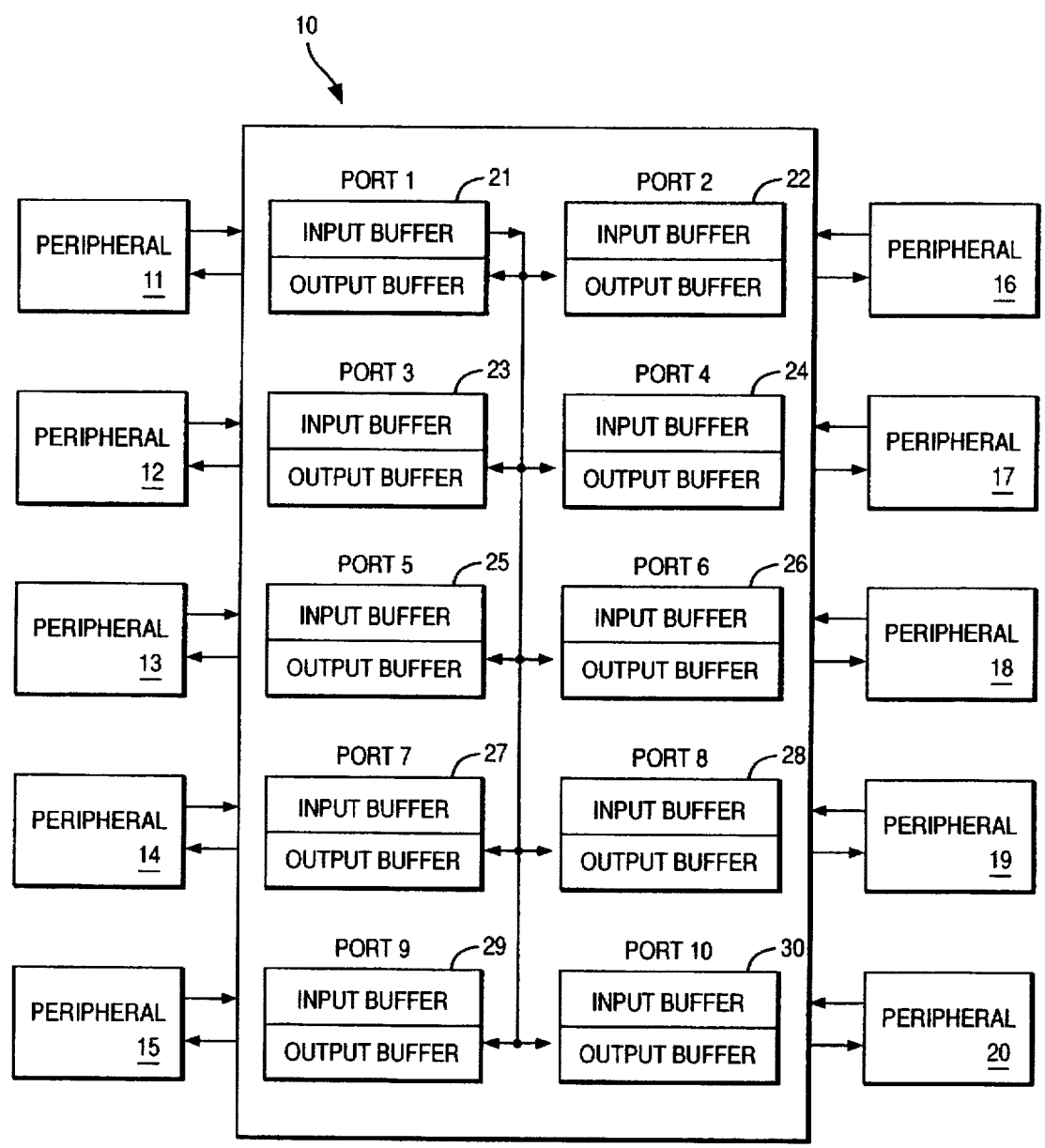
FIG. 1 is a block diagram of a crossbar switch with input and output buffers as contemplated by this invention.

This invention provides a protocol and apparatus for a crossbar switch for updating the input/output buffers in one clock cycle. A representative hardware environment is depicted in FIG. 1, which illustrates a crossbar switch 10. The crossbar switch 10 has ten ports (21–30), with each port having an input buffer and an output buffer. For the purpose of illustration, the wiring for port 1 (21) of the crossbar switch is shown. The input buffer of port 1 (21), is an origin of communications, and is shown connected to the output buffer of all ten ports (21–30). One skilled in the art will appreciate that ports 2–10 (22–30) are similarly wired, but the wiring has been omitted for clarity. Ports 1–10 (21–30), and the attendant wiring, are implemented on a semiconductor device. Peripheral devices 11–20, are shown connected to crossbar switch 10, and are capable of bi-directional communications through the crossbar switch 10.

Figure 2:
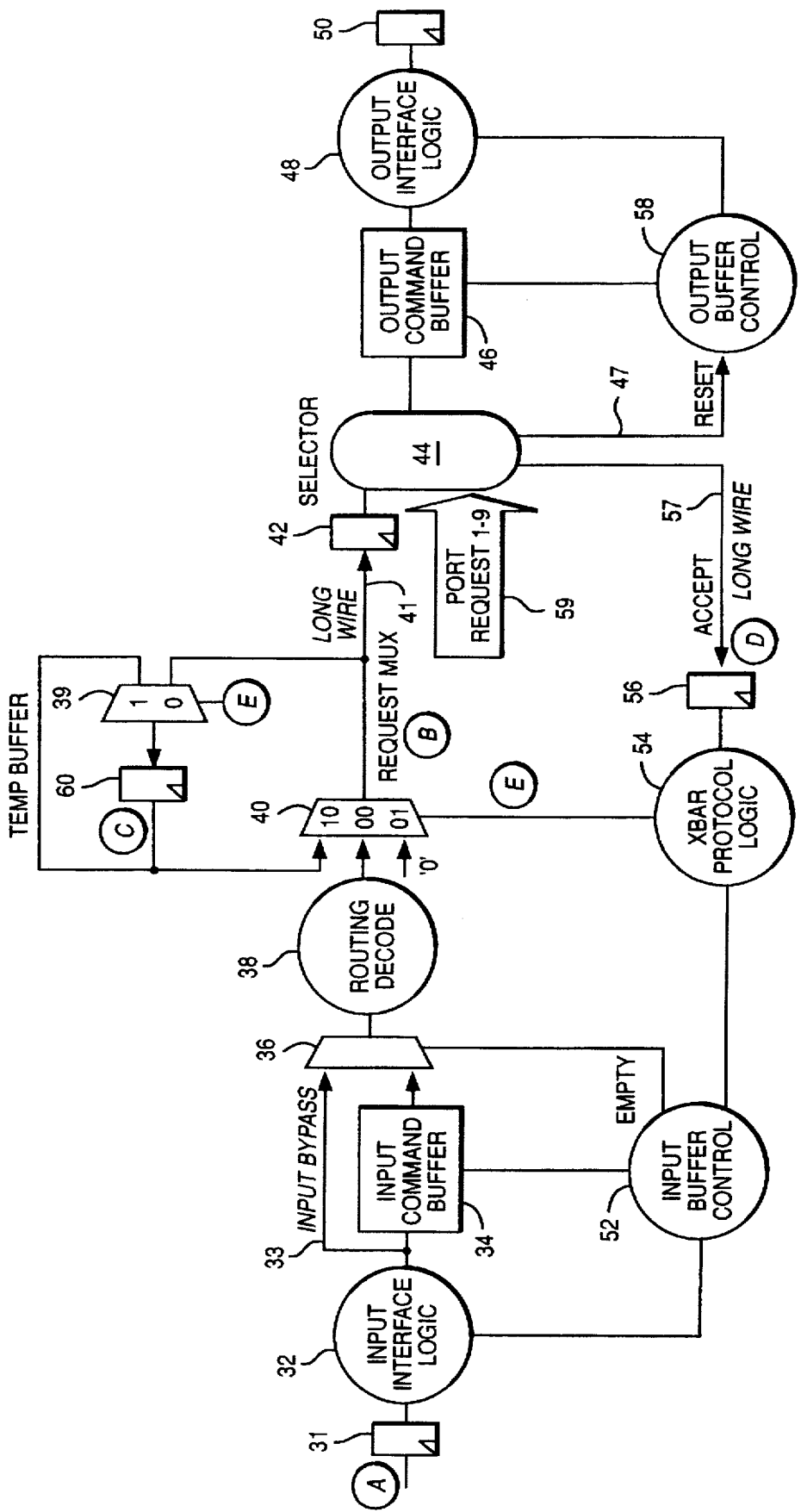
FIG. 2 is an implementation of the crossbar switch architecture as used in this invention.

With reference to FIG. 2, an architecture is shown for a crossbar switch where the protocol of this invention is practiced. The crossbar switch architecture consists of latch devices 31, 50 which serve as an interface to peripherals transferring data through the switch. The crossbar switch architecture uses a separate data path and command path to propagate information from one port to another. An example of a command path is illustrated in FIG. 2. The data path (not shown) is similar and uses control information from the selector 44, crossbar protocol logic 54 and buffer controls 52, 58. The invention can propagate two types of commands, an address only (A) command and an address with data (AD) command. The address command is a single packet requiring one cycle to clock the transaction into the switch. The address with data command can vary between two to nine packets, with the first packet always being an address that is associated with the following data. It takes as many clocks as there are packets to clock the complete transaction through the crossbar switch. Routing and size of transaction information is also stored with the two commands. Returning to FIG. 2, input interface logic 32 is available for receiving commands from peripheral devices. The input interface logic 32 provides control signals to an input command buffer (ICB) 34, input buffer control 52 logic and a multiplexer 36. The input interface logic 32 provides the type of request and routing information to the request multiplexer 40 without writing to the input command buffer 34. If the input command buffer 34 is not empty, the input interface logic 32 causes information to be written to the input command buffer 34, and prohibits its selection to the request multiplexer 40 until all preceding commands are processed. The input bypass path 33 is used when the input command buffer 34 is empty. Routing decode 38 logic controls the request multiplexer 40, which transmits a request signal 41 over a long wire (e.g., semiconductor chip wiring) to latches 42. A selector 44 is provided for determining which of 9 port requests 59, will be allowed to write an output command buffer (OCB) 46. The OCB 46 is controlled by output buffer control logic 58, which in turn supplies controls for the output interface logic 48. The selector 44, generates a reset 47 signal, and an accept signal 57 which is transmitted over a long wire. The accept signal 57 is latched in device 56. One skilled in the art will appreciate that the request signal 41 and accept signal 57, must traverse long wire lengths on the order of 2 to 10 millimeters on a semiconductor device, during transfers through the crossbar switch. The long wire lengths, coupled with a cycle time of 5 nanoseconds, does not allow a request to be sent and an accept acted upon in the same cycle. This invention overcomes these obstacles through the above architecture which allows the next available command to be queued to the request multiplexer 40, and the active request to be written into the output command buffer 46, before the accept is evaluated. The above design allows bypassing of the input command buffer (ICB) 34 when it is empty, and data can be propagated from an input buffer to an output buffer in one clock cycle.

Figure 3:
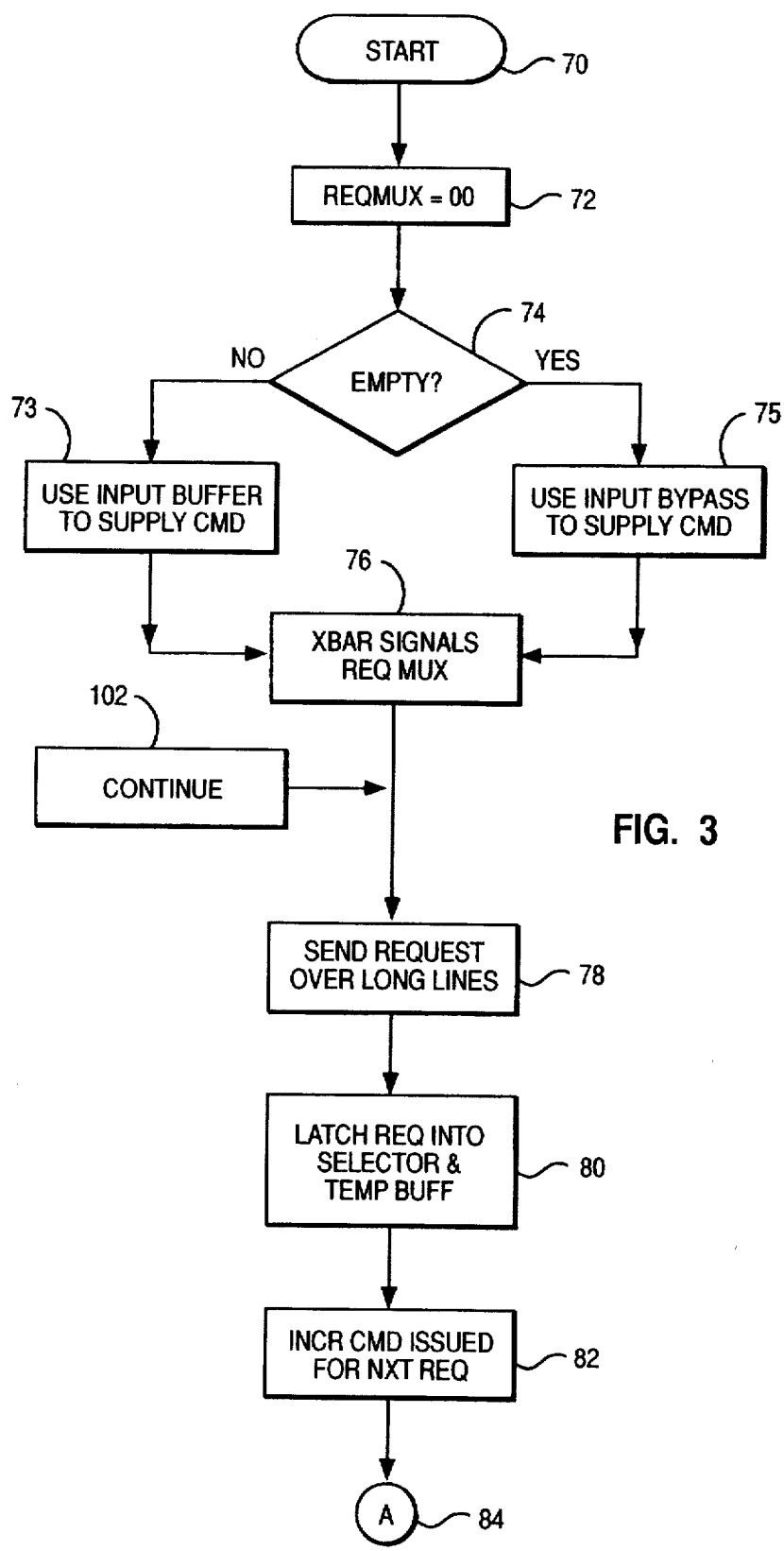
FIGS. 3–4 are flow diagrams for the protocol of the crossbar switch used in this invention.
Figure 4:
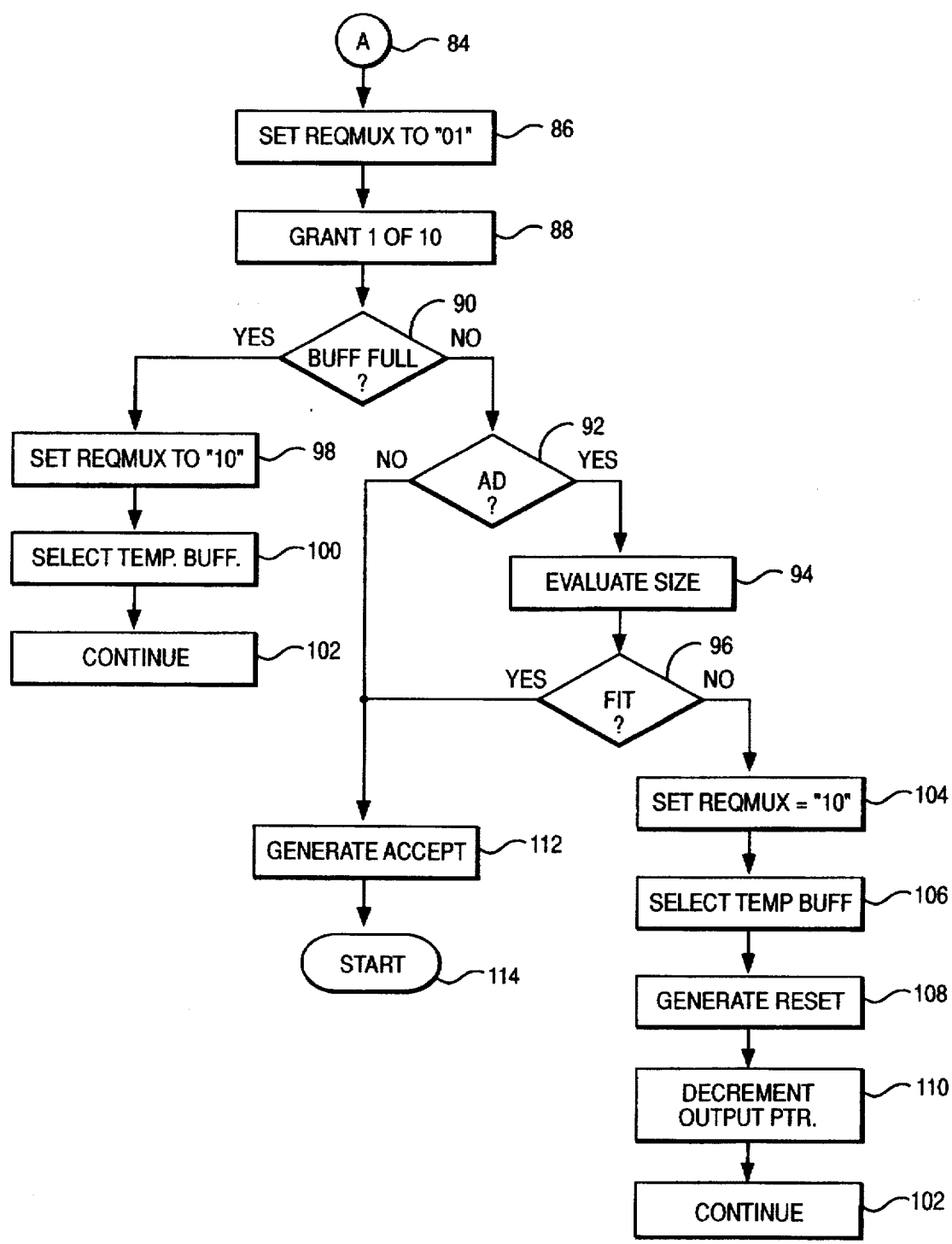

The operation of the above crossbar architecture of FIG. 2, will be further described with the crossbar switch protocol in FIGS. 3–4. Turning now to FIG. 3, the procedure starts at block 70 and proceeds to block 72 where the request multiplexer 40 (FIG. 2), equals "00". At block 74, the input buffer control 52 determines if the input command buffer 34 is empty. If YES, at block 75 the crossbar switch protocol logic 54 (FIG. 2), signals the request multiplexer 40 to use the input bypass 33, to supply the command. The request 41 becomes available and is sent over the long lines between the ports, as shown in block 78. As shown in block 80, the request 41 is latched into device 42 at the selector 44 and the temporary buffer 60 through multiplexer 39. At block 82, an increment command is issued by the input buffer control 52 to allow the next request from the input command buffer 34 to become an input to the request multiplexer 40. Returning to block 74, if the input command buffer 34 is not empty, the input command buffer 34 is used to supply the next command, as shown in block 73. The xbar protocol logic 54, signals the request multiplexer 40, to select the appropriate path as indicated in block 76. A request 41 is sent over the long wire per block 78, to be latched in temporary buffer 60, and to be used as an input to the selector 44, via latch device 42, as shown in block 80. In turn, an increment command is issued for the next command in the input command buffer 34, as shown in block 82.

Turning now to FIG. 4, the protocol proceeds through block 84 to block 86, where the xbar protocol logic 54 (FIG. 2) sets the request multiplexer 40 to "01", and the arbitrator within selector 44, produces a grant for one of the ten possible requesting ports as shown in block 88. The protocol determines at block 90, if the input command buffer 34 is full. If NO, at block 92, the procedure checks to see if the command is an address with data command. If YES, the size of the transaction is evaluated as shown in block 94. At block 96, if the transaction will fit into the input command buffer 34, at block 112, an accept 57 is generated and the communications is started as shown in block 114. Returning to block 92, if the command is an address only command, the protocol proceeds directly to block 112 where an accept 57 is generated. Returning to block 90, if the input command buffer 34 is full, at block 98 the xbar protocol logic 54 sets the request multiplexer 40 to "10". At block 100, the temporary buffer 60 is selected to resend the command, and the procedure continues at block 102 (FIG. 3). Returning to block 96, if the transaction will not fit into the input command buffer 34, at block 104, the request multiplexer 40 is set to "10". At block 106, the temporary buffer 60 is selected and the selector 44 generates a reset 47. The output buffer control 58, decrements an output pointer for output command buffer 46, and the protocol proceeds through block 102 (FIG. 3).

It is important to note that the crossbar switch protocol provides the capability of choosing between resending the same command in the temporary buffer 60, or sending a command out of the input command buffer 34. Also, if the input command buffer 34 is chosen, the output of this input command buffer 34 is made available the cycle after the original request is sent to the selector. This design prevents wasting a cycle to retrieve the next command from the input command buffer 34 when an accept is active. The invention allows the next available command to be queued to the request multiplexer 40, and the active request to be written into the output command buffer 46 before the accept is evaluated. Along with the advantage of bypassing the input command buffer 34 when it is empty, the propagation of data from an input buffer to an output buffer can be reduced by two cycles.

Figure 5:
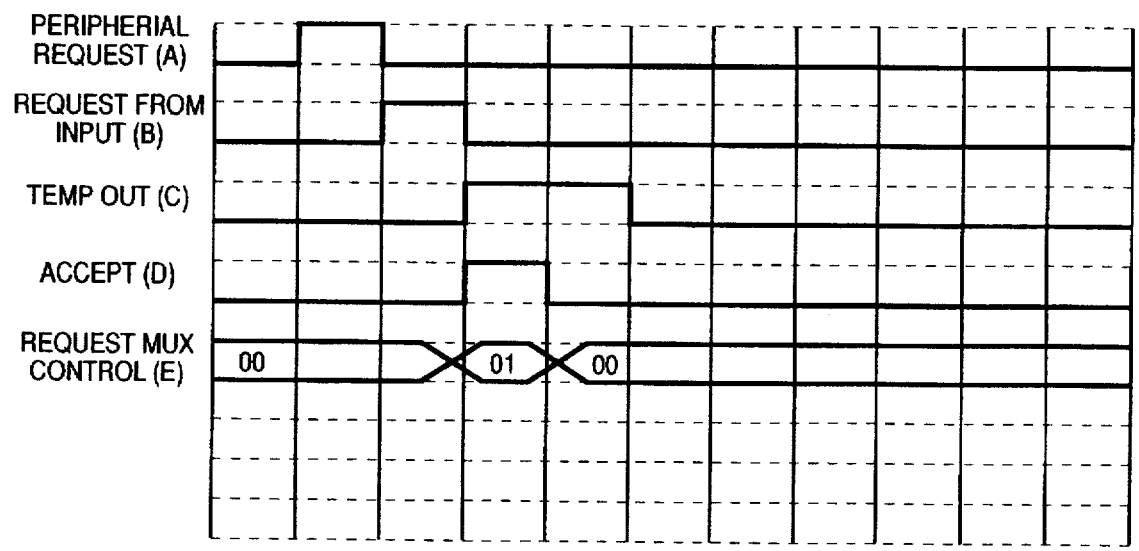
FIG. 5 is a timing diagram of a normal transaction through the crossbar switch of the invention.

Turning now to FIG. 5, a timing diagram is shown for a normal transaction through the crossbar architecture of FIG. 2. The first signal (A), represents a peripheral request from one of a plurality of peripheral devices. The peripheral request is presented at device 31 of FIG. 2. The second signal (B), is the request 41 generated at the output of the request multiplexer 40. The third signal (C), is the latched output of the temporary buffer 60. The fourth signal (D), is the accept signal 57 generated by the selector 44. The fifth and final signal (E), represents the least significant bit (LSB), and controls the selection of the appropriate input of the request multiplexer 40. As illustrated in the timing diagram of FIG. 5, the invention is capable of providing data one clock cycle after the request.

Figure 6:
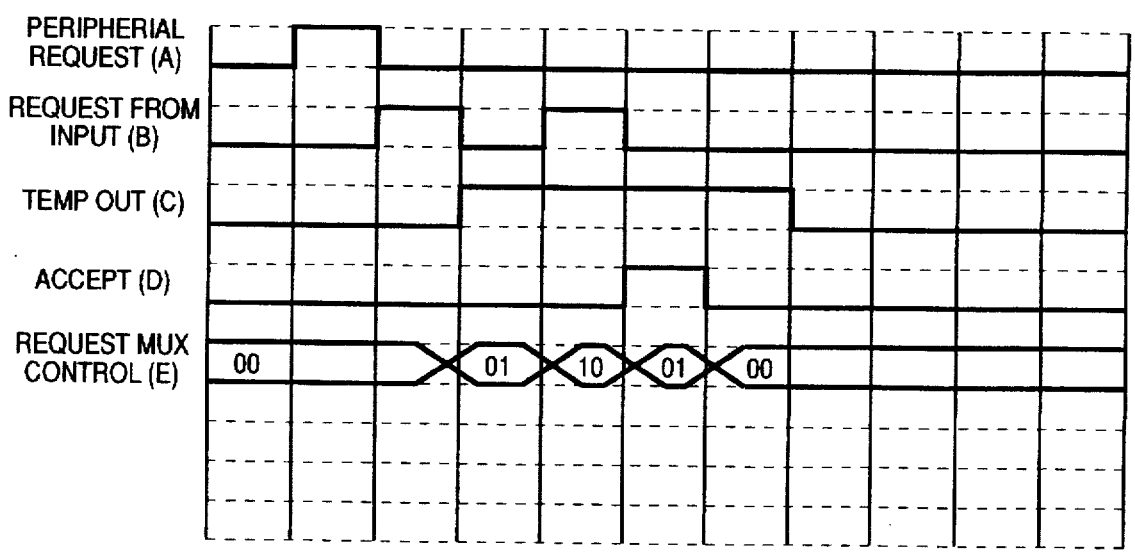
FIG. 6 is a timing diagram of an output buffer busy transaction in the crossbar switch of the invention.

Turning now to FIG. 6, a timing diagram is shown for the signals described in FIG. 5, for an output command buffer 46 (FIG. 2) busy condition. The timing diagram illustrates the delayed generation of the accept 57 (D), when the output command buffer 46 is full.

While the invention has been described with respect to a preferred embodiment thereof, it will be understood by those skilled in the art that various changes in detail may be made therein without departing form the spirit, scope, and teaching of the invention. Accordingly, the herein disclosed invention is to be limited only as specified in the following claims.

What we claim is:

1. A protocol for propagating commands from an input buffer to an output buffer for a plurality of ports of a port addressable crossbar switch, wherein each of said plurality of ports has at least one input buffer and at least one output buffer, comprising:

generating a request associated with a command from a selected one of said input buffers to transfer said command to a selected one of said output buffers;

determining one of a plurality of paths to said selected output buffers for minimum delay through said port addressable crossbar switch;

transmitting said request and said command to said selected one of said output buffers by said determined path;

receiving said request at said selected one of said output buffers; and determining by said selected one of said output buffers an accept for transmittal to said selected one of said input buffers, said command written to said output buffer prior to the determination of said accept.

2. The method of claim 1 wherein said determining step further comprises:

prohibiting the generation of said accept and generating a reset when said command cannot be received at said input buffer.

3. The method of claim 1 wherein said determining step further comprises:

generating an accept by said output buffer to said input buffer that a second command can be transmitted.

4. A method for communicating between a plurality of ports in a port addressable crossbar switch, wherein each of said plurality of ports of said crossbar switch has an input buffer for receiving communications and an output buffer for sending communications, comprising:

receiving a command from one of a plurality of peripheral devices by an input buffer to communicate with a selected one of said ports on said crossbar switch;

checking the input buffer of said selected one of said ports and determining one of a plurality of paths for minimum delay to said selected one of said ports and generating a request associated with said command to communicate with the output buffer of said selected one of said ports; and transmitting said request and said command to said output buffer by said determined path; and receiving said command into said output buffer at said selected one of said ports and simultaneously transmitting an accept to said input buffer.

5. The method of claim 4 wherein the step of checking further comprises:

determining at said input buffer of said selected one of said ports that said input buffer is empty, and using a bypass path for generating said request to said output buffer.

6. The method of claim 4 wherein the step of checking further comprises:

determining at said input buffer of said selected one of said ports that said input buffer is not empty;

writing said command into said input buffer; and prohibiting the selection of said command until a preceding request has completed.

7. The method of claim 5 wherein the command is an address only communication.

8. The method of claim 5 wherein the command is an address with data transfer.

9. An apparatus for communicating between a plurality of ports in a port addressable crossbar switch, wherein each of said plurality of ports of said crossbar switch has an input buffer for receiving communications and an output buffer for sending communications, comprising:

means for receiving a command from one of a plurality of peripheral devices by an input buffer to communicate with a selected one of said ports on said crossbar switch;

means for checking the input buffer of said selected one of said ports and determining one of a plurality of paths for minimum delay through said crossbar switch and generating a request associated with said command to communicate with the output buffer of said selected one of said ports; and means for transmitting said request and said command to said output buffer by said determined_path; and means for receiving said command into said output buffer at said selected one of said ports and simultaneously transmitting an accept to said input buffer.

10. The apparatus of claim 9 wherein the means for checking further comprises:

means for determining at said input buffer of said selected one of said ports that said input buffer is empty, and using a bypass path for generating said request to said output buffer.

11. The apparatus of claim 9 wherein the means for checking further comprises:

means for determining at said input buffer of said selected one of said ports that said input buffer is not empty;

means for writing said command into said input buffer; and means for prohibiting the selection of said command until a preceding request has completed.

12. The apparatus of claim 9 wherein the command is an address only communication.

13. The apparatus of claim 9 wherein the command is an address with data transfer.

* * * * *